United States Patent [19]
Hoyne et al.
[11] Patent Number: 4,646,112
[45] Date of Patent: Feb. 24, 1987

[54] ELECTROGRAPHIC STYLUS RECORDING APPARATUS

[75] Inventors: Earl K. Hoyne, Fridley; Charles K. Nordeen, St. Paul, both of Minn.; James D. Young, Cazenovia, N.Y.

[73] Assignee: Minnesota Mining and Manufacturing Company, St. Paul, Minn.

[21] Appl. No.: 837,414

[22] Filed: Mar. 7, 1986

[51] Int. Cl.[4] .............................................. G01D 15/06
[52] U.S. Cl. .................................. 346/153.1; 346/150
[58] Field of Search ....................... 346/153.1, 150, 155

[56] References Cited

U.S. PATENT DOCUMENTS 4,460,907 7/1984 Nelson .............................. 346/153.1
4,464,672 8/1984 Lindahl ............................ 346/153.1

*Primary Examiner*—Arthur G. Evans
*Attorney, Agent, or Firm*—Donald M. Sell; James A. Smith; Robert L. Marben

[57] ABSTRACT

Electrographic stylus recording apparatus for producing a magnetically attractable toner powder image on a receptor belt including two rotatable cylindrical sleeves, each having a non-rotatable magnetic roll, with one sleeve positioned adjacent the upstream side of a stylus array and the other sleeve adjacent the downstream side with each of such sleeves adapted for connection to a d.c. source, the upstream sleeve being connected to a d.c. source to place toner powder on the receptor belt for delivery of toner powder to the stylus array when a toner image is to be made and the downstream sleeve being connected to a d.c. source to place toner powder on the receptor belt from such sleeve for return to the upstream side of the stylus array via the receptor belt. The magnet rolls within the sleeves are positioned to provide like magnetic poles to the stylus array to provide a magnetic flux at the recording ends of the styli in the array. Each of the magnetic rolls also provide a magnetic pole to the receptor belt at the point where the sleeves are closest to the receptor belt.

7 Claims, 1 Drawing Figure

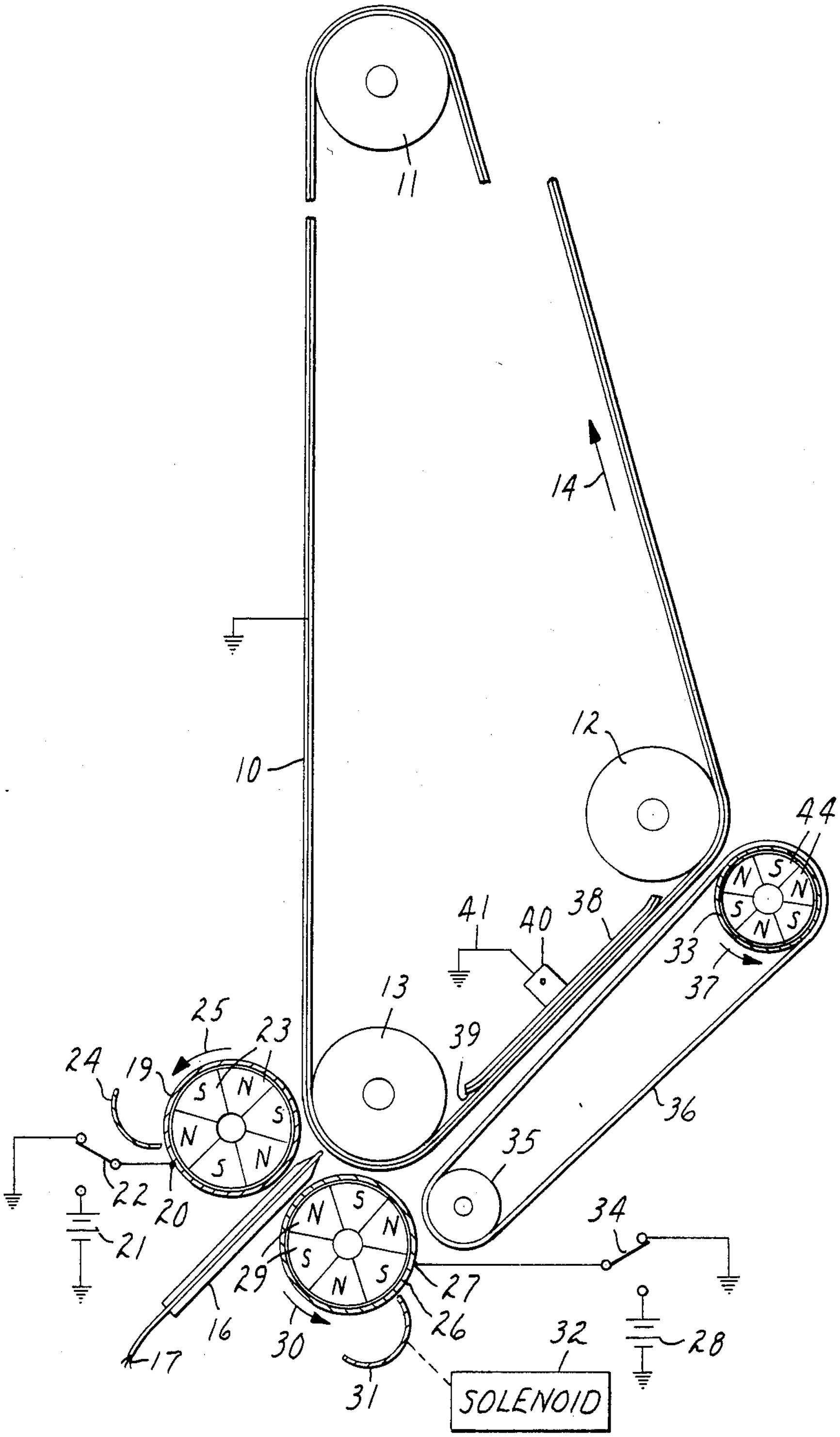
11
14
10
12
44
41
40
38
33
37
13
39
25
23
24
19
36
35
22
20
34
21
29
27
16
30
26
17
31
32
28
SOLENOID
N
S

ELECTROGRAPHIC STYLUS RECORDING APPARATUS

BACKGROUND OF THE INVENTION

1. Field of the Invention

The present invention relates to the field of electrographic stylus recording apparatus capable of producing a toner powder image on a receptor belt and, more particularly, to such apparatus wherein the toner powder image is produced on a receptor recording belt with the toner powder reused for subsequent recording of a toner powder image.

2. Description of the Prior Art

U.S. Pat. No. 4,460,907 issued July 17, 1984 to Kerry S. Nelson discloses an electrographic stylus recording apparatus capable of producing an unfixed or nonpermanent toner powder image on a receptor belt. A stylus array is positioned adjacent to the receptor belt to provide a recording gap. The electrodes of the stylus are preferably comprised of magnetically permeable material and the toner powder used is magnetically attractable and electronically conductive. A magnetic field producing means disposed within a rotatable shell is disposed on opposite sides of the stylus array which causes toner powder presented to the recording gap to bridge between the recording belt and the end of each stylus in the array. Upstream of the magnetic field producing means toner powder is supplied by an applicator to the recording receptor belt for movement to the recording gap. A circuit is established from the applicator to the receptor by the toner powder carried by the applicator. The side of the receptor away from the applicator is connected to ground so that a d.c. voltage applied between the applicator and ground is effective to cause toner powder to be held to the receptor recording belt for movement with the belt to the recording gap. During movement from the applicator to the recording gap there is dissipation of the force holding the toner powder to the receptor recording belt. Such spacing of the toner applicator at a position remote from the recording gap is also used in other electrographic magnetic stylus recording apparatus such as U.S. Pat. No. 3,946,402 to Lunde and U.S. Pat. No. 4,402,000 to Fabel et al. Such remote placement of the toner applicator upstream of the stylus array places restrictions on the design of an electrographic magnetic stylus recording apparatus.

SUMMARY OF THE INVENTION

The present invention provides an electrographic magnetic stylus recording apparatus for use with magnetically attractable toner powder which eliminates the need for placing a toner powder applicator at a position upstream and remote from the stylus array. Such departure from the prior art has resulted in the attainment of other advantages or functions relative to operation of the apparatus and reduces the number of components needed. An electrographic magnetic stylus recording apparatus embodying the invention includes a stylus array having an upstream side and a downstream side with each styli of the stylus array adapted for receiving electrical signals; a first rotatable cylindrical sleeve positioned on the upstream side of the stylus array and adapted for connection to a d.c. voltage; a second rotatable cylindrical sleeve positioned on the downstream side of the stylus array and adapted for connection to a d.c. voltage, each of the first and second cylindrical sleeves disposed transversely of the styli of the stylus array; a first and second non-rotatable magnetic roll positioned within the first and second rotatable cylindrical sleeves, respectively, each presenting alternating magnetic poles at its periphery with like magnetic poles presented to opposite sides of the stylus array; a receptor recording belt adapted for upstream to downstream movement relative to the stylus array and spaced from the stylus array for providing a recording region with the stylus array positioned transversely to the movement of the receptor recording belt; and a roller positioned on the side of the receptor recording belt opposite the recording region and engaged by the receptor recording belt for a portion of the circumference of the roller with each of the first and second cylindrical sleeves positioned near the receptor recording belt at the roller and with each of the first and second magnetic rolls presenting, directly opposite the receptor recording belt, one of its magnetic poles that are adjacent its magnetic pole of the like magnetic poles presented to the stylus array.

When toner is to be deposited in response to electrical signals applied to various ones of the styli, the first rotatable cylindrical sleeve is rotated and is connected to a d.c. voltage while a doctor blade for the second rotatable cylindrical sleeve is positioned to provide the smaller of two gaps. Toner powder is provided at the first cylindrical sleeve and due to the d.c. voltage applied to the sleeve is transferred to the receptor recording belt, the movement of which carries the toner powder to the recording region. Electrical signals applied to various ones of the styli when there is toner powder at the recording gap causes toner powder to be held on the receptor recording belt opposite each styli receiving an electrical signal. Toner powder in excess of that needed to create the image at the recording gap is attracted to the first and second cylindrical sleeves by the magnetic flux presented by the magnetic rolls. In addition, some background or non-imaging toner carried with the receptor recording belt downstream of the recording region is also attracted to the second cylindrical sleeve.

Structure useful for returning toner powder to the upstream side of the stylus array includes the doctor blade for the second cylindrical sleeve which is adapted for movement relative to the second cylindrical sleeve for providing a first gap or a second gap larger than the first gap between the doctor blade and the second cylindrical sleeve and a connection provided at the second sleeve for applying a d.c. voltage to the sleeve. The toner powder collects at the doctor gap which at the smaller setting keeps the toner carried about the second cylindrical sleeve from contacting the receptor recording belt. The toner powder collected during the imaging operation is returned to the first cylindrical sleeve by moving the receptor recording belt while the d.c. voltage is removed from the first cylindrical sleeve with a d.c. voltage applied to the second cylindrical sleeve and the doctor blade positioned to supply the larger gap. The larger gap allows more toner powder on the sleeve so it can bridge between the second sleeve and the receptor recording belt and be held on the receptor recording belt due to the applied d.c. voltage. With further movement of the recording receptor belt, the toner powder is returned to the first cylindrical sleeve when another imaging operation is to be performed at which time toner powder as needed will be deposited on the recording receptor belt under the conditions indicated earlier for presentment to the recording region.

Another aspect of the invention provides for usage of a third rotatable cylindrical shell positioned downstream of the second rotatable cylindrical shell having a nonrotatable magnetic roll within the shell for attracting toner powder from the receptor recording belt. A conveyer belt carried by and driven by the third rotatable cylindrical shell carries the toner powder back to the second rotatable cylindrical shell where the magnetic flux presented by the second magnetic roll attracts the toner powder from the conveyer belt for later return to the receptor recording belt as mentioned earlier. The use within the second cylindrical sleeve of a magnetic roll having a plurality of magnetic poles at its periphery simplifies movement of the toner powder from the conveyer belt to the second rotatable cylindrical shell.

Another feature regarding use of the third rotatable cylinder is its placement downstream at a point where the receptor recording belt makes a turn. Such placement improves the background toner powder removal function.

BRIEF DESCRIPTION OF THE DRAWINGS

The present invention will be more thoroughly described with reference to the accompanying drawing wherein the single FIGURE is a schematic side view of apparatus embodying the invention.

DETAILED DESCRIPTION

The electrographic stylus recording apparatus embodying the invention presented herein is one which carries out a printing or recording process which is commonly referred to as electrographic magnetic stylus recording. This process has been described in several articles, such as the one by L. W. Carlson, "Electrographic Magnetic Stylus Recording; A High Speed Non-Impact Magnetic Printing Process," IEEE Transactions of Magnetics, Vol. May-17, No. 6, Nov. 1981. Several references are listed in the article which are pertinent to the recording process. Such process is utilized in the apparatus disclosed in U.S. Pat. No. 4,460,907, supra. As in the apparatus of the such patent, the apparatus embodying the present invention is used to produce nonpermanent or unfixed toner images and provides for return of toner powder that is collected for reuse in the recording process. Magnetically attractable, electronically conductive toner powder is used.

Referring to the drawing, the apparatus embodying the invention presented herein is diagrammatically shown and includes a receptor recording belt 10 which is flexible and includes a backing layer of a material such as polyester on which a thin dielectric layer is carried with a thin conductive layer intermediate the dielectric layer and the polyester. It should be noted that due to the size of the apparatus, a portion of the belt 10 has been removed in the drawing so that other portions of the apparatus can be presented to clearly show various details. The conductive layer can be indium tin oxide, for example. The conductive layer of the belt 10 is represented by the center line of the side view of belt 10 in the drawing and is connected to ground. One way for making such connection involves having the width of the dielectric layer less than the width of the conductive layer allowing the conductive layer to be contacted by a conductive brush that is connected to ground. Since a wear problem is presented, it is desirable to have the edge of the conductive layer to be contacted, covered with a durable conductive coating. For example, graphite applied using a mixture of graphite and alcohol will provide such a coating. One or more driven rolls, represented at 11–13, move and direct the receptor belt in a counterclockwise direction as viewed in the drawing and indicated by the arrow 14. The dielectric layer of the belt 10 is presented at the outer surface of the belt. The drive means for the driven roll(s) includes an electric motor (not shown). The inner surface of the receptor recording belt makes contact with the rolls 11–13.

A stylus electrode array 16 is positioned on the dielectric layer side of the receptor recording belt 10 opposite the roller 13. The stylus electrode array extends generally perpendicular to the receptor recording belt 10 and transverse to the direction of movement of the receptor recording belt. The stylus electrode array 16 includes a number of parallel conductive styli that are closely spaced and insulated from one another. Conductors indicated at 17, one for each stylus, are used for selectively applying recording electrical signals to the styli from a source (not shown). The stylus electrodes are preferably comprised of magnetic permeable material. The array 16 is positioned so one end of each stylus electrode is a relatively short distance from the receptor recording belt 10 establishing a recording region or gap at each stylus to which toner powder is delivered. The recording gap preferably should be large enough so a plurality of toner particles, forming at least one elongate toner chain-like aggregate, can be accommodated in the gap at each stylus electrode thereby insuring a suitable electronically conductive path between the tip of each stylus electrode and the receptor recording belt to cause toner particles to be held by an electrical charge to the receptor recording belt 10 opposite a given stylus electrode whenever an electrical signal is applied to such stylus electrode.

A toner powder applicator in the form of a first rotatable, electrically conductive, cylindrical sleeve 19 is positioned on the upstream side of the stylus array 16 within a short distance of the stylus array 16 and the receptor recording belt 10. The sleeve 19 has a connection 20 to which a d.c. voltage, depicted by the battery 21, can be supplied via a switch means, as indicated by the switch 22. The sleeve 19 is disposed with its axis extending transversely to the styli of the stylus array. The toner powder applicator also includes a non-rotatable magnetic field producing means positioned within the sleeve 19 that provides a plurality of alternate magnetic poles around the inner surface of the sleeve 19. The magnetic field producing means can be formed by a number of magnet sectors 23. In the embodiment shown in the drawing, six magnet sectors 23 are used. The magnetic field producing means is positioned so a magnet sector presenting a north (south) magnetic pole is positioned directly opposite the stylus array 16 for use in providing magnetic flux at the recording ends of the styli. With the magnetic field producing means so positioned, the south (north) magnetic pole, adjacent to the north (south) magnetic pole opposite the stylus array, is positioned directly opposite the receptor recording belt 10. The toner applicator also includes a doctor blade member 24 for controlling the depth of toner powder to be presented on the sleeve 19. A "C"-shaped doctor blade member 24 is shown, the "C"-shape serves to provide sufficient capacity for holding the amount of toner powder that is needed for an apparatus of the type disclosed wherein the toner powder is reused. When the apparatus is operated to produce a toner powder image the sleeve 19 is rotated and is connected by the switch 22 to the d.c. voltage 21. While the sleeve 19 can be rotated in either direction, counterclockwise movement, as indicated by the arrow 25, is preferred. This causes toner powder to be presented to the gap between the sleeve 19 and the receptor recording belt 10. The toner powder bridges the gap between the sleeve 19 and the receptor recording belt 10 due to the magnetic flux present at the gap and due to the applied d.c. voltage toner powder is held to the belt by an electrical force allowing toner powder to be moved in a controlled manner to the recording gap at the stylus array. The toner powder applicator also functions to remove excess toner powder from the recording gap due to the magnetic field presented by the magnetic field producing means within the sleeve 19 and rotation of the sleeve 19 thus providing further control over the amount of toner powder in the recording gap.

During an image recording operation the toner powder presented to the recording gap will bridge the gap due to the magnetic flux present at the end of each styli. Those styli receiving an electrical signal will cause toner powder opposite each such stylus to be held to the receptor recording belt 10 and thus cause a toner image to be formed which is carried downstream from the recording gap by movement of the belt 10. Accordingly, all the toner powder is not used to form an image so such excess toner powder and other toner powder held loosely on the belt 10 as the belt moves downstream must be removed to have a clear toner powder image present for viewing as the belt 10 moves downstream of the roller 12. A second rotatable, electrically conductive, cylindrical sleeve 26 is positioned on the downstream side of the stylus array 16 within a short distance of the stylus array 16 and the receptor recording belt 10. Like sleeve 19, sleeve 26 has a connection 27 to which a d.c. voltage, depicted by battery 28, can be supplied via switch means, as indicated by the switch 34. The sleeve 26 is disposed with its axis extending transversely to the styli of the stylus array. Like sleeve 19, the sleeve 26 has a non-rotatable magnetic field producing means positioned within sleeve 26 that provides a plurality of alternate magnetic poles around the inner surface of the sleeve 26. This magnetic field producing means can be formed by a number of magnet sectors 29. In the embodiment shown in the drawing, six magnet sectors 29 are used. The magnetic field producing means for sleeve 26 is positioned so a magnet sector presenting a north (south) magnetic pole is positioned directly opposite the stylus array 16 to provide like magnetic poles on opposite sides of the stylus array. This magnetic pole adds to the magnetic flux provided at the recording ends of the styli by the north (south) magnetic pole positioned on the upstream side of the stylus array 16. With the magnetic field producing means in sleeve 26 so positioned, the south (north) magnetic pole, adjacent to the north (south) magnetic pole positioned opposite the stylus array, is positioned directly opposite the stylus receptor recording belt 10. The sleeve 26 can be arranged to rotate either clockwise or counterclockwise. Counterclockwise rotation is preferred as indicated by the arrow 30. When the apparatus is operated to produce toner powder images the sleeve 26 is not connected to a d.c. voltage, but is preferably connected to ground via the switch 34. During such operation excess toner powder at the recording region and toner powder loosely held on the belt 10 in the area a short distance downstream from the recording gap is attracted to the sleeve 26 by its magnetic flux producing means and is carried counterclockwise by rotation of the sleeve 26.

As in the case of the sleeve 19, the sleeve 26 has a doctor blade member 31 which serves to control the thickness of the toner powder carried on the outer surface of sleeve 26. Unlike the doctor blade member 24, the doctor blade member 31 is arranged to provide two different gaps at the sleeve 26. A small gap is provided when the apparatus is operated to produce a toner powder image. The small gap keeps the thickness of the toner powder on the sleeve 26 at a level such that it does not touch the surface of the belt 10. The doctor blade member 31 is shown presenting the small gap in the drawing. A larger gap is provided by the doctor blade member 31 at the sleeve 26 when the apparatus is operated to return toner powder collected at the sleeve 26 to the upstream side of the stylus array 16, as will be explained. The doctor blade member 31 is shown as a "C"-shaped member to provide sufficient capacity for holding toner powder collected at the sleeve 26. The doctor blade member 31 can be pivotally mounted and linked to a rotary or linear solenoid, as indicated by the solenoid 32, to position the doctor blade member 31 for the desired doctor gap setting.

When six magnet sectors are used within the sleeve 19 and sleeve 26, the positioning of the magnet sectors as described relative to the stylus array 16 and belt 10 can be optimized by placing the centers of rotation for the roller 13 and the sleeves 19 and 26 at the corners of an equilateral triangle. The sleeves 19 and 26 are then of the same diameter.

The arrangement provided by the apparatus shown in the drawing provides a way for returning toner powder from the sleeve 26 to the upstream side of the stylus array 16 without the use of any parts in addition to those already described. It should be noted also that the return of toner powder for reuse, as will be described, does not require any lateral movement of the toner powder so abrasion of the toner is minimized.

When the apparatus of the drawing is to be operated to return toner powder from the area of the sleeve 26 to the upstream side of stylus 16, the belt 10 can be driven either clockwise or counterclockwise, the doctor blade member 31 is positioned to provide the larger doctor gap that has been mentioned and the sleeve 26 is connected to a source of d.c. voltage. Twenty volts have been found to be sufficient. No voltage is connected to the sleeve 19 at this time and it is preferably connected to ground via the switch 22. With the large doctor gap provided at the sleeve 26 sufficient toner is supplied between the sleeve 26 and the surface of the belt 10 which, under the influence of the magnetic flux presented by the south magnetic pole positioned opposite the belt 10, causes the toner powder to stand up, forming toner trees to bridge the space between the sleeve 26 and the belt 10. With the d.c. voltage applied to the sleeve 26, the toner powder is caused to be held on the belt 10 as it moves carrying the toner powder away from the sleeve 26 to the upstream side of the stylus 16. The toner powder is then either removed from the belt 10 when it reaches the sleeve 19 where it is magnetically attracted to the sleeve or is redeposited on the belt 10 for the next image should it reach the sleeve 19 when a d.c. voltage is applied to sleeve 19 for operation of the apparatus to create a toner image. In this later case, removal of the toner powder brought on the belt 10 to the sleeve 19 and disposition of a layer of toner powder on the belt 10 at the sleeve 19 occurs simultaneously. In such case, the function of transporting toner collected on the downstream side of the stylus array 16 to the upstream side of the stylus array for reuse is accomplished even if the recirculated toner is not removed from the belt 10.

In order to provide for a more complete removal of background toner powder and, therefore, provide a better toner image for viewing when the belt 10 is moved downstream of the roller 12, a rotatable, cylindrical sleeve 33 with a non-rotating magnetic flux producing means 44 positioned within the sleeve 33 is provided opposite the roller 12 with the sleeve spaced a short distance from the belt to enable the magnetic flux produced by the magnetic flux producing means 44 to attract background toner powder carried by the belt 10 toward the shell 33. The magnetic flux producing means 34 is shown as one made up of a multiplicity of magnet sectors wherein a plurality of alternate magnetic poles are provided at its periphery with such assembly positioned to place one of the magnetic poles directly opposite the belt 10. It is sufficient for the function to be performed to have only a single magnet positioned opposite the belt 10 and within the sleeve 33. An idler roller 35 is positioned near the sleeve 26 and opposite the magnetic pole nearest the sleeve 33 provided within the sleeve 26. A conveyer belt 36 having a width sufficient to extend for the width of a toner image produced on belt 10 is carried on the sleeve 33 and the roller 35. The material for the belt 36 can be conductive rubber fabric sheeting. The sleeve 33 acts as a drive roll and is adapted for rotation counterclockwise as indicated by arrow 37 to move the belt 37 counterclockwise. Toner powder attracted toward the sleeve 33 by the magnet positioned opposite the belt 10 is carried by the conveyer belt 36 to a point opposite the sleeve 26 where it is attracted by the magnetic pole within sleeve 26 that is opposite the belt 36. With this arrangement all toner powder removed from the receptor recording belt 10 on the downstream side of the stylus 16 is collected at the sleeve 26 from which it is returned to the upstream side of the stylus 16 has been described.

Another feature of the apparatus shown in the drawing is the use of a metal plate 38 on which a fabric sheet material 39 is carried. The plate 38 is secured to a cross bar 40 which is connected to a drag line (not shown) at each end to allow the plate 38 to float freely to provide good contact by the fabric 39 with the non-image carrying surface of the belt 10. The cross bar 40 is connected to ground as indicated by the ground connection 41. The structure just described serves to remove any electrical charge that may build up on the non-image carrying surface of the belt 10 and also dampens any flutter of the belt that may occur in its movement from roller 13 to roller 12. The fabric 39 can be a conductive loop fabric available from Velcro USA Incorporated, 88 Park Avenue, Nutley, N.J. 07110, USA, under the designation V2211.

While there has been described what is at present considered to be the preferred embodiment of the invention, it will be understood that various modifications may be made therein and it is intended to cover in the appended claims all such modifications as fall within the true spirit and scope of the invention.

We claim:

1. An electrographic magnetic stylus recording apparatus for use with magnetically attractable toner powder including:

a stylus array having an upstream side and a downstream side, each styli of said stylus array adapted for receiving electrical signals;

a first rotatable, cylindrical sleeve positioned on the upstream side of said stylus array and adapted for connection to a d.c. voltage;

a second rotatable, cylindrical sleeve positioned on the downstream side of said stylus array and adapted for connection to a d.c. voltage, each of said first and second rotatable, cylindrical sleeves disposed transversely of the styli of said stylus array;

a first and second non-rotatable magnetic roll positioned within said first and second rotatable, cylindrical sleeves, respectively, each presenting alternate magnetic poles at its periphery with like magnetic poles presented to opposite sides of said stylus array;

a receptor recording belt adapted for upstream to downstream movement relative to said stylus array and spaced from said stylus array for providing a recording region, said stylus array positioned transversely to the movement of said receptor recording belt; and a roller positioned on the side of said receptor recording member opposite said recording region and engaged by said receptor recording belt for a portion of the circumference of said roller, each of said first and second rotatable, cylindrical sleeves positioned near said receptor recording belt at said roller, each of said first and second magnetic rolls presenting directly opposite said receptor recording belt one of its magnetic poles that are adjacent its magnetic pole of said like magnetic poles.

2. An electrographic magnetic stylus recording apparatus according to claim 1 further including:

a doctor blade member adapted for movement relative to said second rotatable, cylindrical sleeve for providing a first gap or a second gap larger than said first gap between said doctor blade member and said second rotatable, cylindrical sleeve;

a connector at said second rotatable, cylindrical sleeve; and switch means connected to said connector for connecting a d.c. voltage to said second sleeve.

3. An electrographic magnetic stylus recording apparatus according to claim 2 wherein said doctor blade member is "C"-shaped.

4. An electrographic magnetic stylus recording apparatus according to claim 2 further including a solenoid operatively connected to said doctor blade member for use in providing movement of said doctor blade member for providing said first or second gaps.

5. An electrographic magnetic stylus recording apparatus according to claim 1 further including a third rotatable, cylindrical sleeve positioned upstream of said second rotatable, cylindrical sleeve and near said receptor recording belt; a magnetic flux producing means within said third rotatable sleeve for attracting toward said third rotatable, cylindrical sleeve any toner powder that is carried loosely on said receptor recording belt; an idler roller positioned near said second rotatable, cylindrical sleeve; and a conveyer belt mounted on said third rotatable, cylindrical sleeve and said idler roller for carrying any toner attracted toward said magnetic flux producing means to said second rotatable, cylindrical sleeve for attraction to same by said second non-rotatable, cylindrical sleeve.

6. An electrographic magnetic stylus recording apparatus according to claim 1 further including a free floating metal plate, a conductive fabric carried by said metal plate, said metal plate connected to ground and positioned on the downstream side of said stylus array with said conductive fabric contacting the side of said receptor recording belt that is away from said stylus array.

7. An electrographic magnetic stylus recording apparatus according to claim 1 wherein each of said first and second non-rotatable magnetic rolls include six magnet sectors positioned for presenting said alternating magnetic poles.

* * * * *